(12) United States Patent
Brummett et al.

(10) Patent No.: US 6,932,148 B1
(45) Date of Patent: Aug. 23, 2005

(54) VEHICLE HEATING AND COOLING SYSTEM

(75) Inventors: Keiv Brummett, Atoka, OK (US); Bobby L. Pannell, Copper Canyon, TX (US); Neal G. Shields, Fort Worth, TX (US); Robert H. Tigner, Dalworthington Gardens, TX (US)

(73) Assignee: SCS Frigette, Fort Worth, TX (US)

( * ) Notice: Subject to any disclaimer, the term of this patent is extended or adjusted under 35 U.S.C. 154(b) by 0 days.

(21) Appl. No.: 10/957,461

(22) Filed: Oct. 1, 2004

Related U.S. Application Data (63) Continuation-in-part of application No. 10/680,309, filed on Oct. 7, 2003, now abandoned.

(60) Provisional application No. 60/416,633, filed on Oct. 7, 2002.

(51) Int. Cl.[7] .......................... F25B 29/00; B60H 1/00; B60H 3/00; B60H 1/22

(52) U.S. Cl. .......................... 165/43; 165/42; 165/202; 123/142.5 R; 62/236; 62/239; 62/244; 62/323.1; 237/12.3 A; 237/12.3 B (58) Field of Search .......................... 165/202, 42, 43, 165/41; 123/142.5 R; 62/323.1, 239, 238.6, 62/238.7, 236, 244; 180/68.1, 68.2; 290/1 A (56) References Cited

U.S. PATENT DOCUMENTS

| | | | |
|---|---|---|---|
| 3,699,870 A | 10/1972 | Cantagallo et al. | |
| 4,448,157 A | 5/1984 | Eckstein et al. | |
| 4,611,466 A | 9/1986 | Keedy | |
| 4,748,824 A | 6/1988 | Wakabayashi et al. | |
| 4,762,170 A | 8/1988 | Nijjar et al. | |
| 5,020,320 A | 6/1991 | Talbert et al. | |
| 5,253,700 A | 10/1993 | Early, Jr. | |
| 5,319,944 A | 6/1994 | Uehara | |
| 5,333,678 A | 8/1994 | Mellum et al. | |
| 5,528,901 A | 6/1996 | Willis | |
| 5,765,805 A | 6/1998 | Kennedy | |
| 6,047,942 A | 4/2000 | Kennedy | |
| 6,677,684 B1 | 1/2004 | Kennedy | |
| 6,681,588 B2 * | 1/2004 | Zeigler | 62/244 |
| 6,756,693 B2 | 6/2004 | Kennedy | |
| 2002/0056993 A1 | 5/2002 | Kennedy | |
| 2003/0034147 A1 | 2/2003 | Houck et al. | |
| 2003/0070849 A1 | 4/2003 | Whittaker | |
| 2003/0141049 A1 | 7/2003 | Kennedy | |
| 2004/0145185 A1 | 7/2004 | Kennedy | |

* cited by examiner

Primary Examiner—John K. Ford
(74) Attorney, Agent, or Firm—Bracewell & Giuliani LLP (57) ABSTRACT

A heating and air-conditioning system has an auxiliary engine for heating and cooling of a vehicle while the primary engine of the vehicle is not operating. The vehicle has a sleeper compartment with a sleeper compartment air conditioning unit powered by the main engine. An auxiliary air conditioning system located exterior of the sleeper compartment is powered by the auxiliary engine. An auxiliary supply duct extends into the sleeper compartment and joins the duct of the sleeper compartment air conditioning unit. A valve operated by air pressure blocks air flow from the sleeper compartment air conditioning unit into the auxiliary duct while in the main position. In the auxiliary position, the valve blocks air flow from the auxiliary duct into the sleeper compartment air conditioning unit.

19 Claims, 6 Drawing Sheets

VEHICLE HEATING AND COOLING SYSTEM

CROSS-REFERENCE TO RELATED APPLICATION

This invention is a continuation-in-part to Ser. No. 10/680,309, filed Oct. 7, 2003, now abandoned which claims priority to provisional application Ser. No. 60/416,633, filed Oct. 7, 2002.

FIELD OF THE INVENTION

This invention relates in general to heating and cooling systems for vehicles, and in particular to a system utilizing an auxiliary engine.

BACKGROUND OF THE INVENTION

Large tractor trucks typically have air-conditioning systems similar to automobiles. The truck engine drives a compressor that compresses refrigerant and delivers it to a condenser. The condenser converts the hot gaseous refrigerant to a liquid refrigerant. The refrigerant flows to an evaporator where it undergoes a pressure drop, converting the refrigerant to a cold gas. An interior fan flows air through the evaporator into the interior of the vehicle. The condenser is cooled by the main engine fan, which also flows air through the engine radiator.

For heating, a heater coil or element is mounted in the vehicle in communication with the radiator via hoses. A portion of the hot engine coolant flows through the heater coil. The interior fan flows air through the heater coil to heat the interior of the vehicle.

Many large trucks have sleeper compartments attached to the cab for allowing the driver to rest. In most cases, for heating and cooling, the operator continues to operate the main truck engine at idle while sleeping in order to run the air-conditioner or heater. Often, the sleeper compartment will have a sleeper compartment evaporator, heater coil and blower. The evaporator in the sleeper compartment is in parallel with the truck cab evaporator, and the heater in the sleeper compartment is in parallel with the truck cab heater. The main air conditioner compressor and condenser supply refrigerant to the sleeper compartment evaporator, consequently, the truck engine must be operated. While idling, the main engine generates far more power than needed for heating and cooling, consequently consumes considerable fuel while the driver is resting.

Generators have been mounted to large trucks for generating 115 volt AC power. An auxiliary engine, normally diesel, is located in a compartment along with a generator. Usually, a separate 110 volt air-conditioning unit mounts to the sleeper compartment or cab. The air-conditioning unit has an electrical motor that drives the compressor and the fan. For heat, an electrical resistance element may be employed, or the air-conditioner may be operated as a heat pump. Heating by a 110 volt air conditioner unit, however, consumes a considerable amount of power.

Another approach for heating and cooling while the truck is stopped is to utilize a 110 volt air conditioning unit and a power cord that extends to a power service receptacle at a rest stop. Many rest stops, however, do not have such provisions for connecting a vehicle to electrical power.

Also, auxiliary power units are known that use an auxiliary engine to directly drive an auxiliary air conditioner compressor. An auxiliary condenser is mounted in the auxiliary housing. An auxiliary evaporator, heating element, and blower are mounted in the sleeper compartment, typically under the bunk or bed. The auxiliary blower discharge is independent of the ducts of the rear sleeper compartment air conditioning unit. The auxiliary engine normally also drives an alternator for supply DC power to the blower and other DC equipment.

SUMMARY OF THE INVENTION

In this invention, an auxiliary engine is mounted in a housing, which in turn is mounted to the vehicle. The vehicle has a sleeper compartment and a sleeper compartment air conditioning and heating assembly that is powered by a main engine of the vehicle. An auxiliary power unit housing containing an auxiliary engine is mounted to the vehicle. A compressor is mounted to and driven by the auxiliary engine. A condenser is mounted in the housing in fluid communication with refrigerant compressed by the compressor.

An auxiliary evaporator and heater housing is carried on a portion of the vehicle exterior of the sleeper compartment. An auxiliary evaporator is located in the evaporator and heater housing in fluid communication with refrigerant condensed by the auxiliary condenser. An auxiliary heater element is located in the evaporator and heater housing. An auxiliary duct leads from the auxiliary evaporator and heater housing to a junction with the ducts of the sleeper compartment air conditioning and heating assembly. An auxiliary blower is mounted adjacent the auxiliary evaporator and auxiliary heater element for moving air through the auxiliary evaporator and auxiliary heater element and through the auxiliary duct into the ducts of the sleeper compartment air conditioning and heating assembly.

In one embodiment, a duct valve has a main position that blocks air flow from the sleeper compartment air conditioning and heating assembly into the auxiliary duct while the sleeper compartment air conditioning and heating system is operating. The valve has an auxiliary position that blocks air flow from the auxiliary duct into the sleeper compartment air conditioning and heating system while the auxiliary blower is operating.

Preferably, the auxiliary heating and air-conditioning system is pre-charged with refrigerant prior to mounting it to the truck. Flexible ducts extend directly from the auxiliary evaporator and heater housing into the interior of the sleeper compartment for supplying and returning conditioned air.

DETAILED DESCRIPTION OF THE INVENTION

Figure 1:
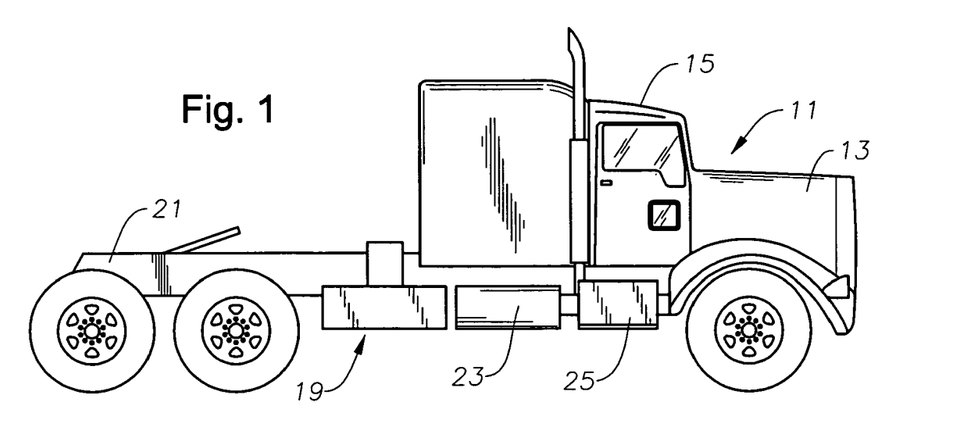
FIG. 1 is a side elevational view of a truck having a first embodiment of an auxiliary air-conditioning and heating unit in accordance with this invention.
Figure 2:
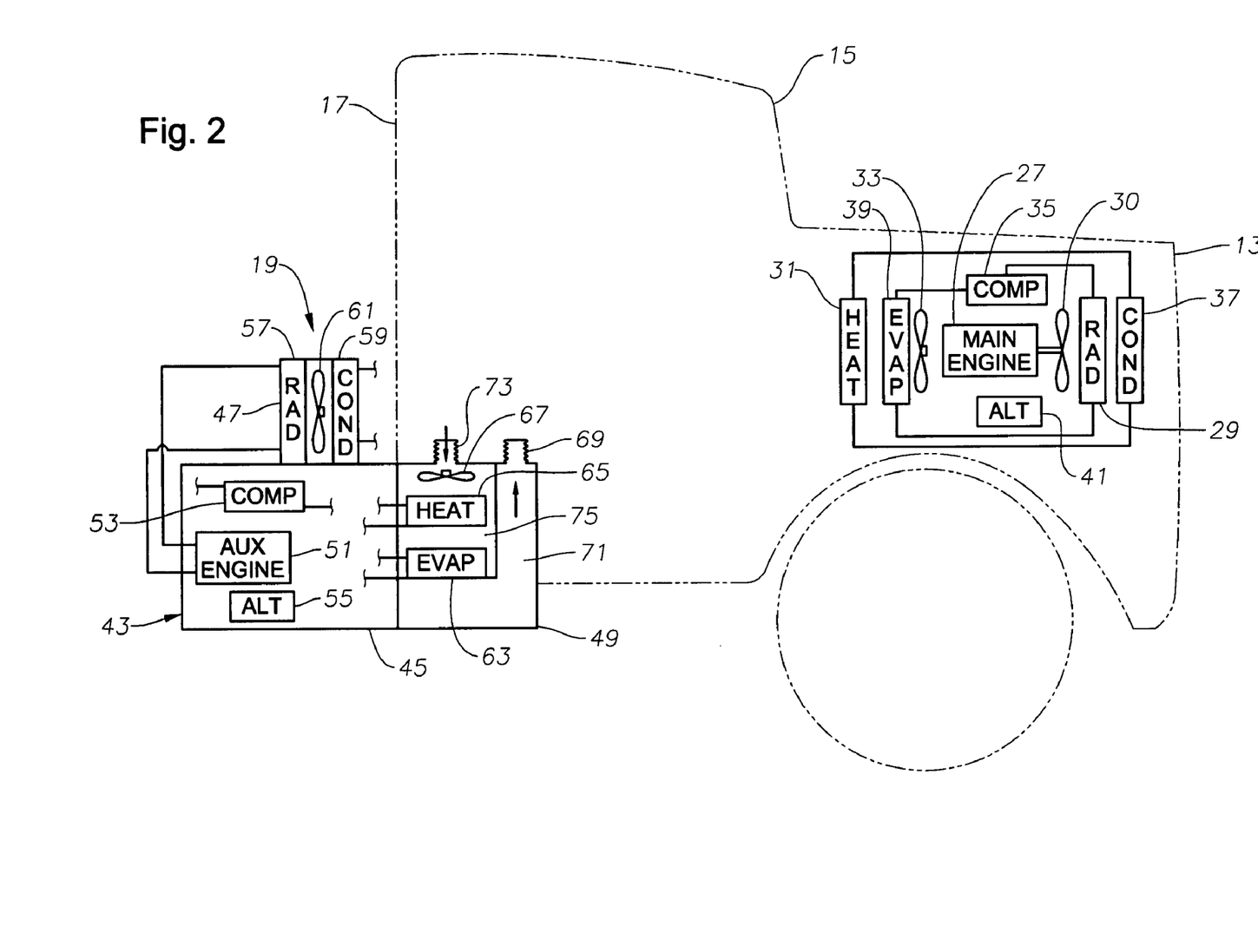
FIG. 2 is a schematic of the main air-conditioning and heating system of the truck and of the unit of FIG. 1.

Referring to FIG. 1, truck 11 has an engine compartment 13 and a cab 15. Optionally, truck 11 may have a sleeper compartment 17 as shown in FIG. 2. The interior of sleeper compartment 17 is in common with the interior of cab 15.

An auxiliary air conditioning unit 19 is shown mounted to frame 21 of truck 11. Air-conditioning unit 19 is located at the rear of and below sleeper compartment 17 in this embodiment. In this embodiment, auxiliary air-conditioning unit 19 is located rearward of a fuel tank 23. Typically, truck 11 will also have a step box 25 located directly below cab 15 in front of fuel tank 23 for providing access to the interior of cab 15.

As shown in FIG. 2, truck 11 has a main or primary engine 27, normally a diesel, which propels truck 11. A main radiator 29 is connected by hoses to main engine 27 for receiving engine coolant. An engine fan 30 is directly driven by main engine 27 for causing air to flow through main radiator 29. Truck 11 also has a main interior heater element or coil 31 and a main interior fan 33. Heater 31 is connected by hoses to radiator 29 for receiving a portion of the flowing engine coolant. Fan 30 causes air to move through heater coil 31 for heating the interior of cab 15 and sleeper compartment 17. Valves (not shown) controlled by the driver will selectively provide or stop flow of engine coolant through heater 31.

For cooling, engine 27 drives a main compressor 35 by a belt (not shown). Compressor 35 delivers hot gaseous refrigerant to a main condenser 37 that is mounted parallel to radiator 29. Condenser 37 condenses the refrigerant to a liquid, which flows to a main evaporator 39. Typically, the same interior fan 33 causes air to flow through evaporator 39 into the interior of cab 15. Main engine 27 also drives a main alternator 41 by a belt. Alternator 41 supplies electrical power for interior fan 33 as well as lights and other accessories.

Auxiliary air-conditioning unit 19 includes a housing 43. In this embodiment, housing 43 is a single integral unit having three compartments 45, 47 and 49. Compartments 45, 47 and 49 are secured to each other, but preferably sealed from the each other.

An auxiliary engine 51 is mounted in first compartment 45. The term "auxiliary" is used herein to mean an engine that does not supply the power to move the vehicle. Auxiliary engine 51 is preferably a small diesel engine. In one embodiment, auxiliary engine 51 has a single cylinder that is horizontally oriented. Auxiliary engine 51 preferably receives its fuel from fuel tank 23 (FIG. 1). Auxiliary engine 51 drives an auxiliary compressor 53, preferably with a belt. Auxiliary engine 51 also drives an auxiliary alternator 55 in this embodiment with a belt. Compressor 53 and alternator 55 are located along with auxiliary engine 51 in first compartment 45.

An auxiliary radiator 57 and an auxiliary condenser 59 are located in second compartment 47. As shown also in FIG. 3, radiator 57 and condenser 59 are parallel to each other for receiving air moved by an auxiliary fan 61. Fan 61 is driven by an electrical motor, which in turn is powered by alternator 55 (FIG. 2). Protective grids 62 are on opposite sides of second compartment 47 to provide protection to the coils contained in radiator 57 and condenser 59. Although fan 61 is shown located between radiator 57 and condenser 59 in this embodiment, other variations are feasible such as locating radiator 57 and condenser 59 in contact with each other or at angles relative to each other.

Referring again to FIG. 2, auxiliary radiator 57 is connected by hoses to auxiliary engine 51 for receiving and cooling engine coolant. Condenser 59 is connected by lines to compressor 53 for condensing hot gaseous refrigerant into a liquid. Second compartment 47 is preferably located on top of first compartment 45. This positions radiator 57 and condenser 59 at a higher elevation than auxiliary engine 51 to reduce the possibility of ice accumulating on grids 62 during icy weather. In this embodiment, second compartment 47 has the same lateral dimension from its inner side to its outer side as first compartment 45. However, the longitudinal dimension from the forward grid 62 to the rearward grid is less than the longitudinal dimension of first compartment 45.

Condenser 59 also has an output line that leads to an evaporator 63. Evaporator 63 is located in third compartment 49. Evaporator 63 includes an expansion valve that reduces the pressure of the refrigerant, causing it to convert to a cold gas. The refrigerant returns from evaporator 63 by a line to compressor 53. Additionally, an auxiliary heater coil or element 65 is located in third compartment 49. Auxiliary heater 65 is connected by lines to radiator 57 for receiving a portion of the hot engine coolant running through radiator 57. Valves (not shown) selectively close the coolant flow through heater 65 while it is not operating.

An auxiliary interior fan 67 is also mounted in third compartment 49 for circulating air through heater 65, evaporator 63 and the interior of cab 15 and sleeper compartment 17. Fan 67 is driven by an electrical motor powered by alternator 55.

Figure 5:
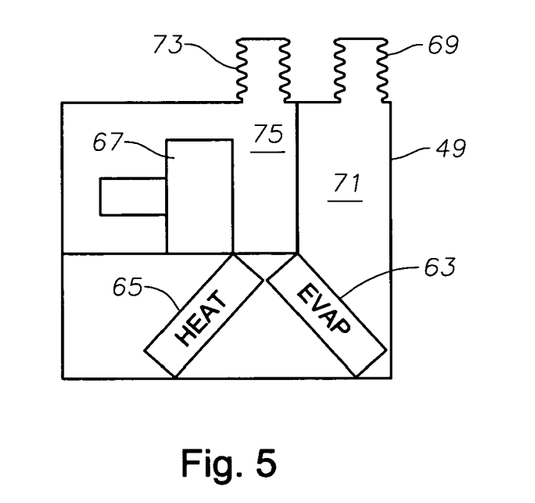
FIG. 5 is a sectional view of the auxiliary heating and cooling unit of FIG. 1, taken along the line 5—5 of FIG. 4.

As shown also in FIG. 5, third compartment 49 has a supply duct 69 that leads to mating ductwork of the air conditioning and heating system (not shown) in sleeper compartment 17 or directly into the interior of sleeper compartment 17. Supply duct 69 is in communication with a supply plenum 71 that forms a part of third compartment 49. A return duct 73 returns air from the interior of sleeper compartment 17 into a return plenum 75. Fan 67 is preferably a squirrel cage blower located within return plenum 75. In this embodiment, heater coil 65 and evaporator 63 are mounted at a 90° angle relative to one another. Fan 67 discharges air through heater coil 65 and evaporator 63 into supply plenum 71. Other variations of heater 65 and evaporator 63 are feasible, such as mounting heater 65 and evaporator 63 parallel to each other.

Referring again to FIG. 3, third compartment 49 is located on the forward side of first compartment 45 at a lower elevation than second compartment 47. Third compartment 49 also has the same lateral dimension as first compartment 45 from its inner side to its outer side. However, its longitudinal dimension from its forward side to its rearward side is less than first compartment 45 in this embodiment.

During assembly of the embodiment of FIGS. 1–5, air-conditioning unit 19 is assembled as an integral operable unit in compartments 45, 47, 49 of its housing 43. The refrigerant within air conditioning unit 19 is pre-charged. Unit 19 is then typically shipped to another facility for installing it on truck 11. Housing 43 is then bolted to frame 21, and ducts 69 and 73 (FIG. 5) are inserted into mating ducts or receptacles within sleeper compartment 17. A fuel line is connected from fuel tank 23 to auxiliary engine 51. An electrical cable is connected from the main batteries (not shown) of truck 11 to the starter of auxiliary engine 51. A control box (not shown) for starting auxiliary engine 51 and controlling air conditioning unit 19 is installed in the interior of sleeper compartment 17 or cab 15. Air conditioning unit 19 is then ready for operation.

During operation, while driving truck 11, the operator would normally utilize only the main heating and cooling system. In cold weather, the operator would utilize main heater 31 and main interior fan 33. In hot weather, the operator would turn on the compressor 35, which results in cold air flowing through evaporator 39 into the interior.

When truck 11 is stopped and main engine 27 is turned off, the operator starts auxiliary engine 51 if heating or cooling is desired. If the weather is cold, the operator can heat the interior of sleeper compartment 17 and cab 15 by opening valves to allow auxiliary engine coolant to flow from auxiliary radiator 57 through heater coil 65. Auxiliary fan 67 causes air to flow through heater coil 65 and out supply duct 69. The air returns by return duct 73.

If the weather is hot, the operator turns on the air conditioning portion of unit 19. Auxiliary engine 51 directly drives compressor 53, which supplies pressurized gaseous refrigerant to condenser 59. The refrigerant flows to evaporator 63, where it is expanded and flows back to compressor 53. Fan 67 discharges air through evaporator 63 and out supply duct 69 into the interior of sleeper compartment 17. The air circulates back through return duct 73.

Figure 3:
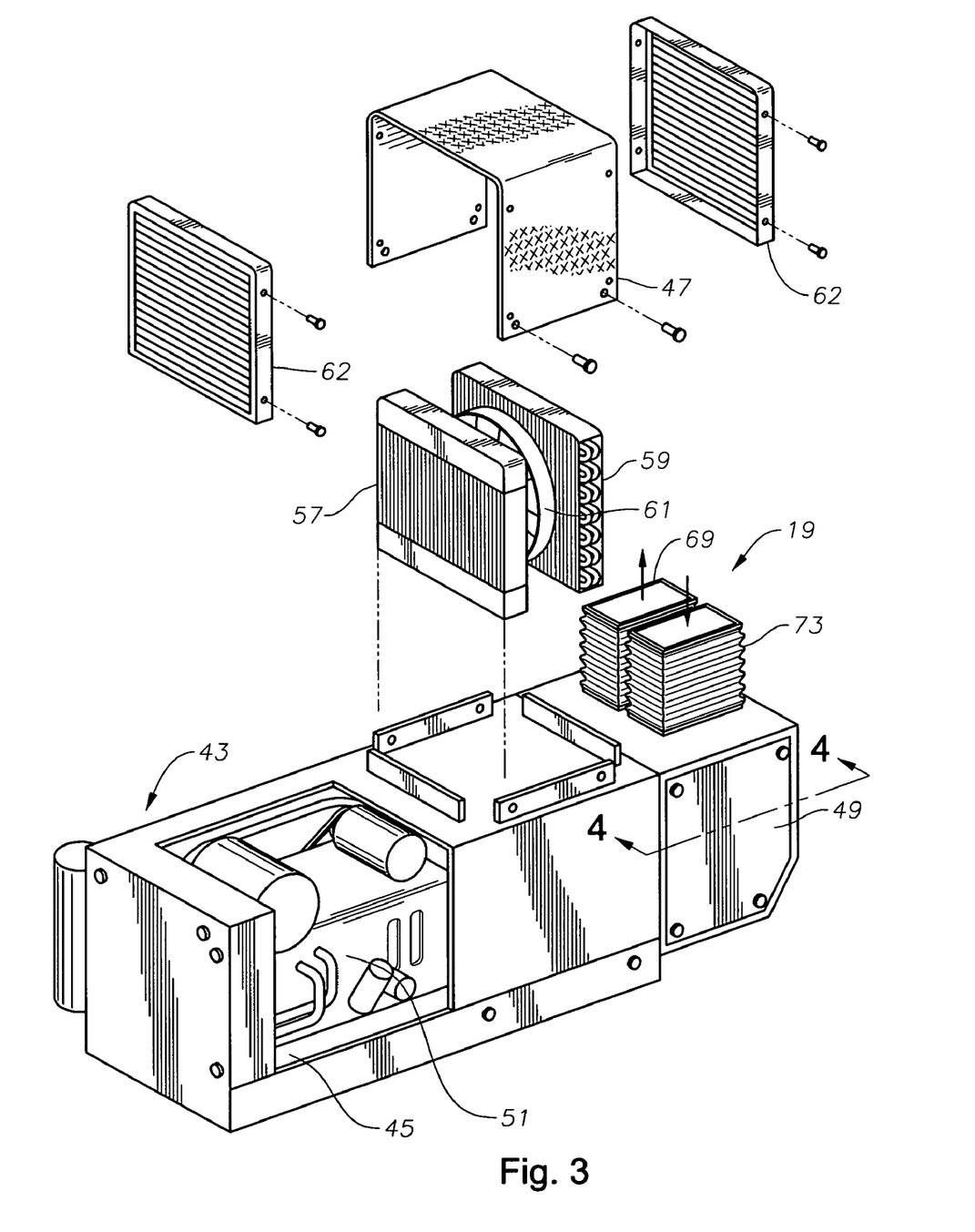
FIG. 3 is en exploded view of a portion of the auxiliary heating and cooling unit of FIG. 1.
Figure 4:
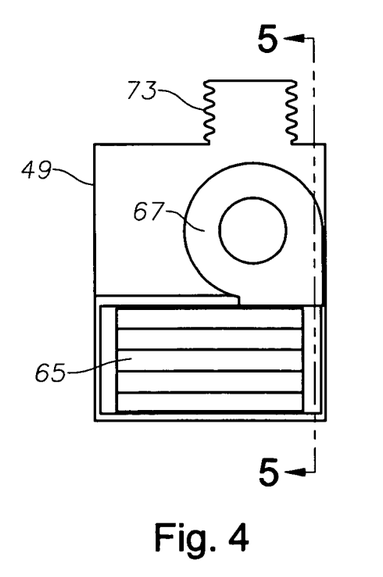
FIG. 4 is a sectional view of the auxiliary heating and cooling unit of FIG. 1, taken along the line 4—4 of FIG. 3.

Although it facilitates assembling to combine the three compartments 45, 47 and 49 into a single integral housing 43, such is not essential. For example, third compartment 49 could be completely separate from first and second compartments 45, 47 and mounted to the floor or an exterior wall of sleeper compartment 17. The components in the first and second compartments 45, 47 could optionally be mounted in step box 25.

FIGS. 6–9 disclose an alternate embodiment of the invention. Truck 77 has a cab 78 and is powered by primary main engine 79. Main engine 79 circulates coolant through a main radiator 81. A fan 83 moves air through radiator 81. Truck 77 has a conventional cab heater coil 85 through which some of the coolant from main radiator 81 may be circulated. A cab blower 87 moves air through heater element 85.

Figure 6:
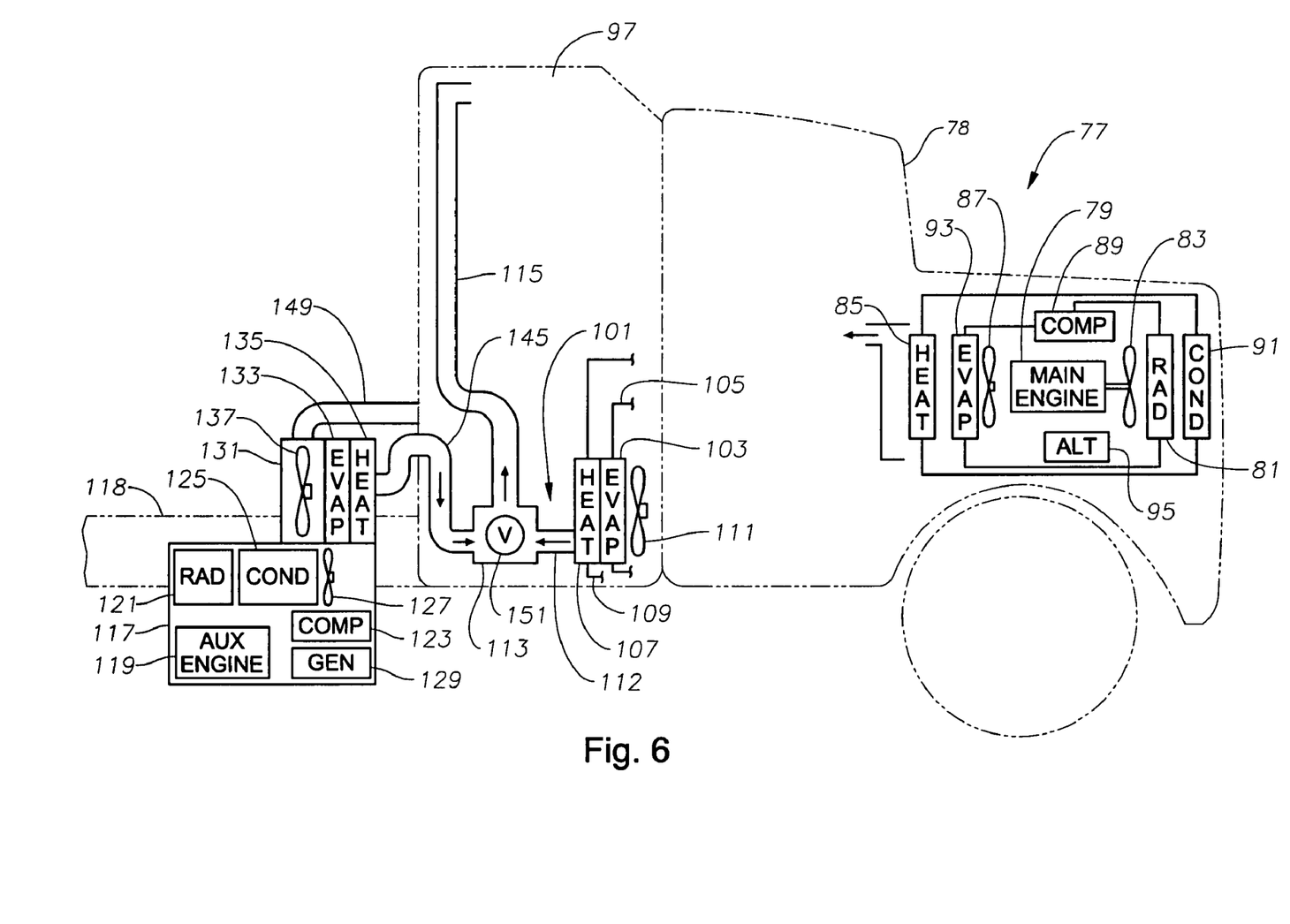
FIG. 6 is a schematic of an alternate embodiment of an auxiliary heating and cooling unit installed on a truck

Truck 77 also has a main air-conditioning system that includes a main compressor 89 directly driven by main engine 79. Compressor 89 circulates refrigerant to a condenser 91 mounted parallel with radiator 81. The condensed refrigerant flows to an evaporator 93 located in the flow stream with cab heater element 85. Truck 77 also has a main alternator 95 that generates DC voltage for operation of the truck and charging batteries (not shown).

Truck 77 has a sleeper compartment 97 mounted at the rear of cab 78. Sleeper compartment 97 may be separate or integrally formed with cab 78, and its interior may be in common with cab 78. Sleeper compartment 97 has a bunk or bed to enable the driver to rest. Sleeper compartment 97 may also have various appliances such as a television, microwave, and the like.

In this embodiment, a rear or sleeper compartment air-conditioning unit 101 is located within sleeper compartment 97. Sleeper compartment air-conditioning unit 101 has an evaporator 103 with lines 105 that place evaporator 103 in parallel with cab evaporator 93. Similarly, sleeper compartment 99 has a heater element 107 with lines 109 that place heater element 107 in parallel with cab heater element 85. Sleeper compartment air-conditioning and heating unit 101 is located within a housing that has an outlet duct 112 for discharging heated or cooled air. Outlet duct 112 joins a plenum 113 in this embodiment. Plenum 113 is in communication with a sleeper compartment duct assembly 115. Duct assembly 115 may comprise more than one duct, each having an outlet for discharging heated or cooled air into sleeper compartment 97.

An auxiliary power unit housing 117 is mounted to truck 77 exterior of cab 78 and sleeper compartment 97. Preferably, auxiliary housing 117 is mounted to a frame member 118 of truck 77. Auxiliary housing 117 contains an auxiliary engine 119, which is preferably a small water-cooled diesel. Auxiliary engine 119 circulates cooling liquid through radiator 121. Auxiliary housing 117 also contains an air-conditioner compressor 123, which is preferably mounted to auxiliary engine 119 and driven by it. Compressor 123 delivers compressed refrigerant to a condenser 125 that is mounted adjacent radiator 121 for condensing the refrigerant. A fan 127 moves air through condenser 125 and radiator 121 to cause the refrigerant to condense and to cool the coolant being circulated through radiator 121. In the preferred embodiment, fan 127 is electrically driven.

An evaporator and heater housing 131 is also mounted to truck 77, preferably exterior of sleeper compartment 97 and cab 78. Evaporator and heater housing 131 may be mounted on top of auxiliary housing 117 or it may be mounted elsewhere, such as to an exterior wall of sleeper compartment 97. Evaporator and heater housing 131 contains an evaporator 133, a heater element 135 and a blower 137. Evaporator 133 receives refrigerant from condenser 125, and an expansion valve causes the refrigerant to drop in temperature as it undergoes a pressure drop. Heater element 135 receives part of the coolant circulated from auxiliary engine 119. A blower 137 causes air to move through evaporator 133 and heater element 135 for heating or cooling.

Figure 7:
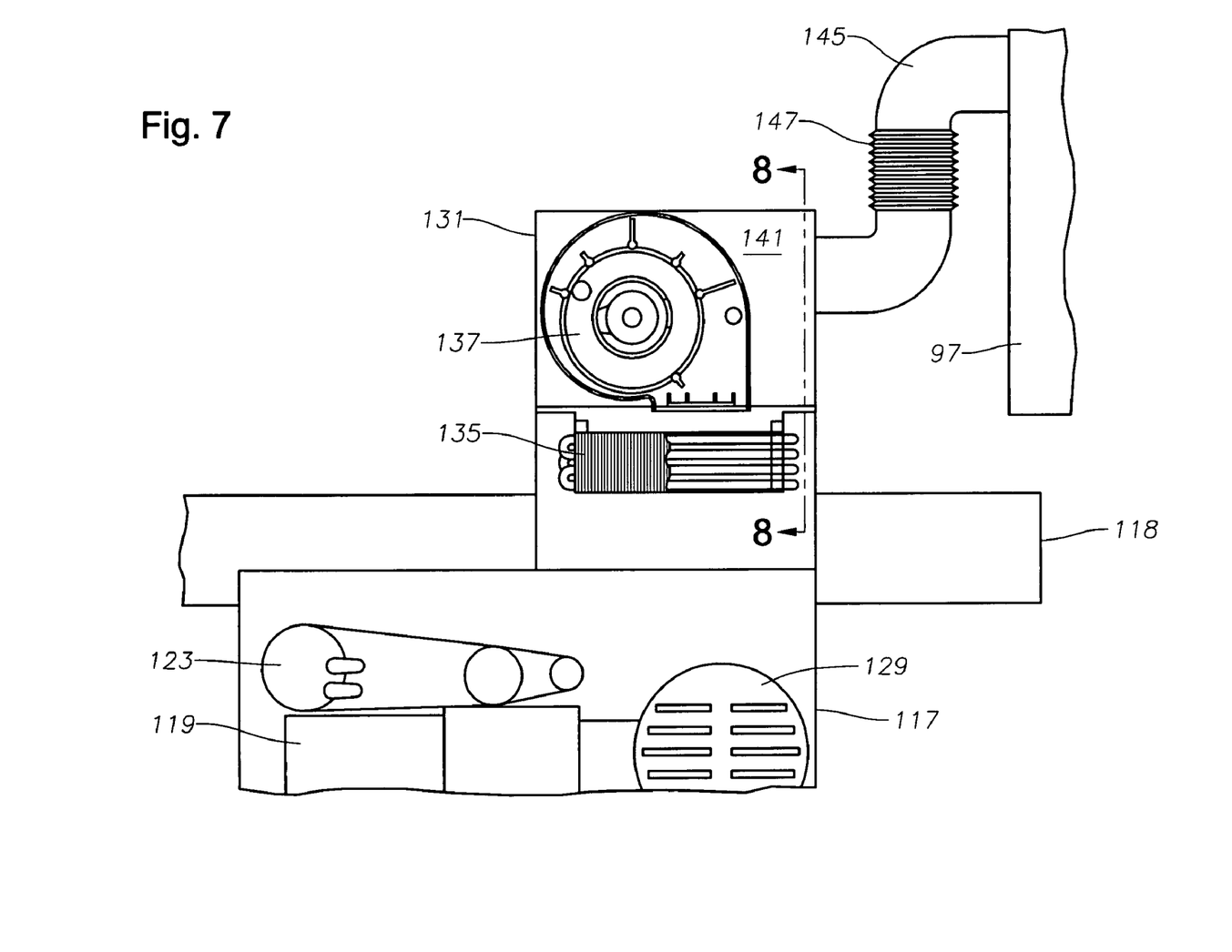
FIG. 7 is an enlarged sectional view of part of the auxiliary heating and cooling unit of FIG. 6.
Figure 8:
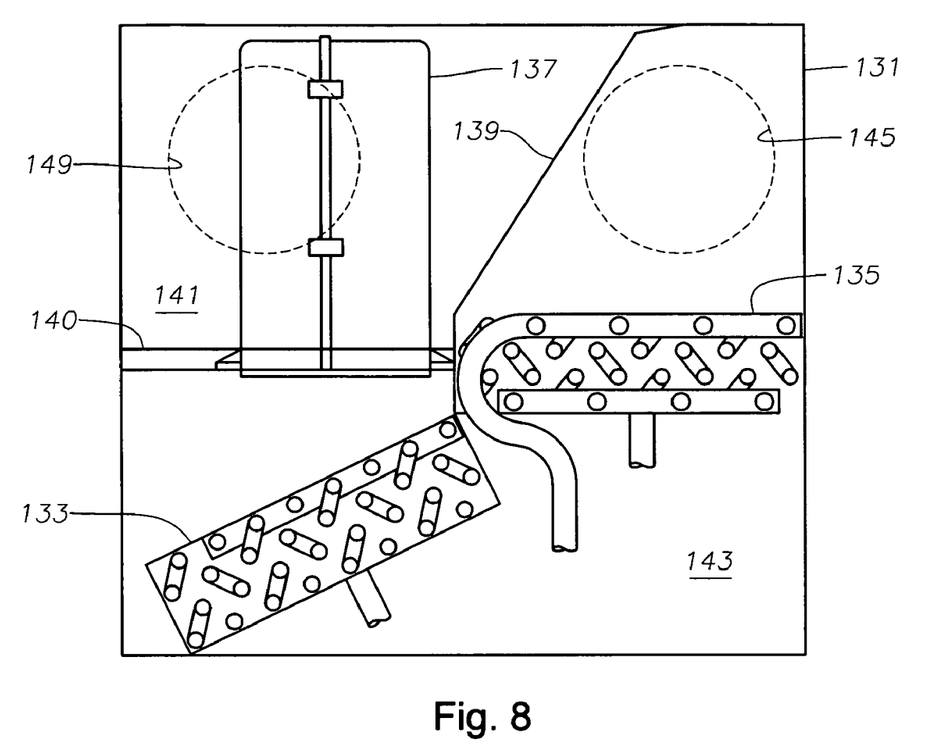
FIG. 8 is a sectional view of the auxiliary heating and cooling unit of FIG. 7, taken along the line 8—8 of FIG. 7.

FIGS. 7 and 8 disclose more details of evaporator and heater housing 131. As shown in FIG. 8, partitions 139 and 140 combine to separate evaporator and heater housing 131 into a return plenum 141 and a discharge plenum 143. Evaporator 133 and heater element 135 are mounted in supply plenum 143. Blower 137, shown also in FIG. 7, is mounted in return plenum 141. Referring also to FIG. 6, an auxiliary supply duct 145 extends from supply plenum 143 into sleeper compartment 97. An aperture is provided in the back wall of sleeper compartment 97 for auxiliary supply duct 145 to extend through. As shown also in FIG. 7, auxiliary supply duct 145 has a flexible section 147 that enables flexing movement of the portion of auxiliary supply duct 145 that joins evaporator and heater housing 131 relative to the portion that extends into sleeper compartment 97. Sleeper compartment 97 will typically oscillate a significant amount relative to frame 118 while truck 77 is moving. Flexible section 147 accommodates this movement.

Similarly, an auxiliary return duct 149 extends from return plenum 141 into an aperture provided in sleeper compartment 97. In FIG. 6, return duct 149 is shown schematically to be of a different configuration than auxiliary supply duct 145, but in practice, it is preferably configured the same and simply spaced laterally from auxiliary supply duct 145. Auxiliary return duct 149 also has a flexible section.

Figure 9:
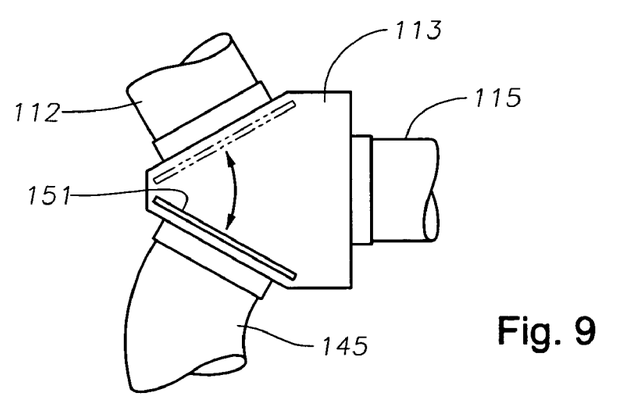
FIG. 9 is a schematic view of a plenum and valve for the auxiliary heating and cooling unit of FIG. 7.

Referring to FIGS. 1 and 9, auxiliary return duct 145 joins a port in plenum 113. A valve 151 is mounted in plenum 113. Valve 151 is a pivotally mounted disc that will block the flow into auxiliary supply duct 145 while in the solid line position of FIG. 9. While in the dotted line position of FIG. 9, valve 155 will block air flow into sleeper compartment supply duct 112. Valve 151 is mounted by a hinge to plenum 113 so that it will freely move between the main position shown by the solid lines and the auxiliary position shown by the dotted lines. Preferably, valve 151 moves in response to air pressure differential. That is, if pressure in auxiliary supply duct 145 is greater than in plenum 113, valve 151 will shift to the dotted line position. Similarly, if the pressure in main supply duct 112 is greater than in plenum 113, valve 151 will move from the dotted line position to the solid line position.

Referring to FIG. 6, in operation, during on the road movement, there is normally no need to run auxiliary engine 119. The operator will cool or heat cab 78 conventionally utilizing heater element 85 or evaporator 93. If the operator wishes to also cool or heat sleeper compartment 97 during on the road movement, the operator will turn on the rear system, which causes either the refrigerant to circulate through sleeper compartment evaporator 103 or coolant from main engine 79 to circulate through sleeper compartment heater element 112. Sleeper compartment blower 111 moves air through evaporator 103 and heater element 107 and to main supply duct 112. Referring to FIG. 9, the greater air pressure in main supply duct 112 causes valve 151 to move to the solid line position, blocking any of the air flow into auxiliary supply duct 145. Instead, the air flows through sleeper compartment duct works 115 into sleeper compartment 97. The operator may also utilize sleeper compartment heater 107 or evaporator 109 while idling main engine 79 for relatively short periods of time.

If the operator wishes to have air-conditioning or heating in sleeper compartment 97 while truck main engine 79 is turned off, he will start auxiliary engine 119. Auxiliary engine 119 drives compressor 123 if cooling is needed. Auxiliary blower 137 discharges air through evaporator 133 into auxiliary supply duct 145. As shown in FIG. 9, the greater air pressure in auxiliary supply duct 145 causes valve 151 to move to the dotted line position. The air flows into sleeper compartment duct works 115 and discharges into sleeper compartment 97.

Similarly, if heat in sleeper compartment is needed, the operator circulates a portion of the coolant from auxiliary engine 119 through heater element 135. Auxiliary blower 137 circulates air through heater element 135. The air flows through plenum 113 and out sleeper compartment duct works 115. Air returns from sleeper compartment 97 through return duct 149 back to return plenum 141 (FIG. 8).

Auxiliary engine 119 also drives a generator 129 in this embodiment. Generator 129 generates AC electricity for running various appliances in sleeper compartment 97. A battery charger (not shown) converts a portion of the AC voltage to DC for charging the batteries of truck 77, for running various pumps associated with auxiliary engine 119, and for operating auxiliary blower 137. Alternately, generator 129 could be an alternator that generates DC voltage.

The invention has significant advantages. The auxiliary unit utilizes existing sleeper compartment duct work, enabling it to be readily installed. The duct valve prevents air flow from the main sleeper compartment air conditioning and heating system from flowing into the auxiliary unit, and vice-versa. The auxiliary evaporator and heater may be exterior of the sleeper compartment to avoid taking up limited space in the interior of the sleeper compartment. The auxiliary unit is pre-charged and does not require extensive installation time.

While the invention has been shown in only two of its forms, it should be apparent to those skilled in the art that it is not so limited but is susceptible to various changes without departing from the scope of the invention.

We claim:

1. In a truck having a cab, a sleeper compartment, a sleeper compartment air conditioning and heating assembly that is powered by a main engine of the truck, the improvement comprising:
    an auxiliary power unit housing mounted to a frame of the truck;
    an auxiliary engine mounted in the auxiliary housing;
    a compressor mounted to and driven by the auxiliary engine;
    a condenser mounted in the housing in fluid communication with refrigerant compressed by the compressor;
    an evaporator and heater housing carried by the truck;
    an auxiliary evaporator in the evaporator and heater housing in fluid communication with refrigerant condensed by the condenser;
    an auxiliary heater element in the evaporator and heater housing;
    an auxiliary duct leading from the auxiliary evaporator and heater housing to a junction with the sleeper compartment air conditioning and heating assembly;
    an auxiliary blower mounted adjacent the auxiliary evaporator and auxiliary heater element for moving air through the auxiliary evaporator and auxiliary heater element and through the auxiliary duct into the sleeper compartment air conditioning and heating assembly; and
    a valve having a first position that blocks air flow from the sleeper compartment air conditioning and heating assembly into the auxiliary duct while the sleeper compartment air conditioning and heating system is operating and a second position that blocks air flow from the auxiliary duct into the sleeper compartment air conditioning and heating system while the sleeper compartment air conditioning and heating system is not operating.

2. The truck according to claim 1, wherein the valve moves between the first and second positions in response to air pressure.

3. The truck according to claim 1, wherein the sleeper compartment air conditioning and heating system comprises:
    a sleeper compartment evaporator and heater element;
    a sleeper compartment duct in the sleeper compartment and having at least one outlet in the sleeper compartment;
    a sleeper compartment blower for moving air through the sleeper compartment evaporator and heater element into the sleeper compartment duct, and wherein the truck further comprises:
    a plenum in the sleeper compartment having a main supply port connected to the sleeper compartment evaporator and heater element, an auxiliary port connected to the auxiliary duct, and an outlet port connected to the sleeper compartment duct; and
    wherein the valve is located within the plenum.

4. The truck according to claim 1, wherein the auxiliary duct has an external portion extending from the auxiliary evaporator and heater housing to an aperture provided in the sleeper compartment.

5. The truck according to claim 1, further comprising a return air duct extending from the sleeper compartment to the auxiliary evaporator and heater housing.

6. The truck according to claim 1, wherein the auxiliary evaporator and heater housing is mounted exterior of the sleeper compartment.

7. The truck according to claim 1, wherein the auxiliary evaporator and heater housing is mounted to the auxiliary power unit housing.

8. In a truck having a cab, a sleeper compartment, a sleeper compartment air conditioning and heating unit having a sleeper compartment duct with an outlet in the sleeper compartment, the improvement comprising:

an auxiliary power unit housing mounted to a frame of the truck;

an auxiliary engine mounted in the auxiliary housing;

an auxiliary compressor mounted to and driven by the auxiliary engine;

an auxiliary condenser mounted in the auxiliary compartment in fluid communication with refrigerant compressed by the compressor;

an auxiliary radiator in fluid communication with coolant circulated through the auxiliary engine;

an auxiliary evaporator and heater housing carried on a portion of the truck exterior of the sleeper compartment and having a discharge chamber and a return chamber;

an auxiliary evaporator in the discharge chamber of the auxiliary evaporator and heater housing in fluid communication with refrigerant condensed by the condenser;

an auxiliary heater element in the discharge chamber of the auxiliary evaporator and heater housing in fluid communication with coolant circulated through the auxiliary engine and the auxiliary radiator;

an auxiliary supply duct leading from discharge chamber of the auxiliary evaporator and heater housing to a junction with the sleeper compartment duct;

a return port in the auxiliary evaporator and heater housing that communicates the return chamber with the interior of the sleeper compartment; and an auxiliary blower mounted in the return chamber of the auxiliary evaporator and heater element for receiving air from the return port and discharging air through the auxiliary evaporator, auxiliary heater and auxiliary supply duct into the sleeper compartment duct.

9. The truck according to claim 8, further comprising:

a valve having a main position that blocks air flow from the sleeper compartment air conditioning and heating unit into the auxiliary supply duct while the sleeper compartment air conditioning and heating unit is operating, and an auxiliary position that blocks air flow from the auxiliary supply duct into the sleeper compartment air conditioning and heating unit while the sleeper compartment air conditioning and heating system is not operating.

10. The truck according to claim 9, wherein the valve moves between the main and auxiliary positions in response to air pressure.

11. The truck according to claim 8, further comprising:

a plenum in the sleeper compartment having a main supply port connected to the sleeper compartment air conditioning and heater unit, an outlet port connected to the sleeper compartment duct, and an auxiliary supply port connected to the auxiliary supply duct; and a valve mounted in the plenum and having a main position that blocks the auxiliary supply port to direct air flowing from the sleeper compartment air conditioning and heating unit into the sleeper compartment duct, and an auxiliary position that blocks the main supply port to direct air flowing from the auxiliary supply duct into the sleeper compartment duct.

12. The truck according to claim 8, wherein the auxiliary supply duct has a flexible external portion extending from the auxiliary evaporator and heater housing to an aperture provided in the sleeper compartment.

13. The truck according to claim 8, further comprising a flexible return air duct extending from the return port in the auxiliary evaporator and heater housing to an aperture provided in the sleeper compartment.

14. The truck according to claim 8, wherein the auxiliary evaporator and heater housing is mounted to the auxiliary power unit housing.

15. In a truck having a cab, a sleeper compartment, a sleeper compartment air conditioning and heating unit and a sleeper compartment duct with an outlet in the sleeper compartment, the improvement comprising:

an auxiliary power unit housing mounted to the truck;

an auxiliary engine mounted in the auxiliary housing;

an auxiliary compressor mounted to and driven by the auxiliary engine;

an auxiliary condenser mounted in the auxiliary compartment in fluid communication with refrigerant compressed by the compressor;

an auxiliary evaporator and heater housing having a discharge chamber and a return chamber that is in communication with an interior of the sleeper compartment;

an auxiliary evaporator in the discharge chamber of the auxiliary evaporator and heater housing in fluid communication with refrigerant condensed by the condenser;

an auxiliary heater element in the discharge chamber of the auxiliary evaporator and heater housing;

a plenum in the sleeper compartment having a main supply port connected to the sleeper compartment air conditioning and heating unit, an auxiliary supply port, and an outlet port connected to the sleeper compartment duct;

an auxiliary supply duct leading from discharge chamber of the auxiliary evaporator and heater housing to the auxiliary supply port;

a return port in the auxiliary evaporator and heater housing that communicates the return chamber with the interior of the sleeper compartment;

an auxiliary blower mounted in the return chamber of the auxiliary evaporator and heater element for receiving air from the return port and discharging air through the auxiliary evaporator and auxiliary heater into the auxiliary supply duct; and a valve mounted in the plenum and having a main position that blocks the auxiliary supply port to direct air flowing from the sleeper compartment air conditioning and heating unit into the sleeper compartment duct, and an auxiliary position that blocks the main supply port to direct air flowing from the auxiliary supply duct into the sleeper compartment duct.

16. The truck according to claim 15, wherein the valve moves from the main position to the auxiliary position in response to greater air pressure in the auxiliary supply duct than in the main supply duct.

17. The truck according to claim 15, wherein the auxiliary supply duct has an external portion extending from the auxiliary evaporator and heater housing to an aperture provided in the sleeper compartment.

18. The truck according to claim 15, further comprising a return air duct extending from the return chamber in the auxiliary evaporator and heater housing to an aperture provided in the sleeper compartment.

19. In a truck having a cab and a sleeper compartment, the improvement comprising:

an auxiliary power unit housing mounted to a frame of the truck;

an auxiliary engine mounted in the auxiliary power unit housing;

an auxiliary compressor mounted to and driven by the auxiliary engine;

an auxiliary condenser mounted in the auxiliary power unit housing in fluid communication with refrigerant compressed by the compressor;

an auxiliary evaporator and heater housing located exterior of the sleeper compartment and the auxiliary power unit housing, and having a discharge chamber and a return chamber;

a flexible supply duct extending exterior of the auxiliary evaporator and heater housing from the discharge chamber to a supply port provided in the sleeper compartment;

a flexible return duct extending exterior of the auxiliary evaporator and heater housing from the return chamber to a return port provided in the sleeper compartment;

an auxiliary evaporator in the discharge chamber of the auxiliary evaporator and heater housing in fluid communication with refrigerant condensed by the auxiliary condenser;

an auxiliary heater element in the discharge chamber of the auxiliary evaporator and heater housing; and an auxiliary blower mounted in the return chamber of the auxiliary evaporator and heater housing for receiving air from the sleeper compartment via the flexible return duct and discharging air through the auxiliary evaporator, auxiliary heater, and flexible supply duct into the sleeper compartment.

* * * * *